United States Patent
Kinoshita et al.

(10) Patent No.: US 6,751,925 B1
(45) Date of Patent: Jun. 22, 2004

(54) FILLING MACHINE

(75) Inventors: Shigehiro Kinoshita, Shizuoka (JP);
Takeo Yamazaki, Tokyo (JP); Yuzo Otsuka, Tokyo (JP); Hiroyuki Nishimura, Kanagawa (JP)

(73) Assignee: Tetra Laval Holdings & Finance, S.A. (CH)

( * ) Notice: Subject to any disclaimer, the term of this patent is extended or adjusted under 35 U.S.C. 154(b) by 0 days.

(21) Appl. No.: 10/018,221

(22) PCT Filed: Jul. 5, 2000

(86) PCT No.: PCT/JP00/04454
§ 371 (c)(1),
(2), (4) Date: Dec. 18, 2001

(87) PCT Pub. No.: WO01/04005
PCT Pub. Date: Jan. 18, 2001

(30) Foreign Application Priority Data

Jul. 7, 1999 (JP) ............................................ 11/193194
Jun. 1, 2000 (JP) ...................................... 2000/164121

(51) Int. Cl.$^7$ ............................ B65B 57/02; B65B 9/06; G01N 21/00
(52) U.S. Cl. ................................. 53/51; 53/52; 53/551; 356/240.1
(58) Field of Search ............................ 53/64, 550, 551, 53/552, 51, 52, 53, 72, 65, 75, 76; 356/237.1, 237.2, 240.1

(56) References Cited

U.S. PATENT DOCUMENTS

| | | | | |
|---|---|---|---|---|
| 2,268,887 A | * | 1/1942 | Matteson | 242/592 |
| 2,871,013 A | * | 1/1959 | Markey | 242/563.1 |
| 3,380,637 A | * | 4/1968 | Knapp | 226/20 |
| 3,533,542 A | * | 10/1970 | Ziebolz et al. | 226/22 |
| 3,680,446 A | * | 8/1972 | James et al. | 493/9 |
| 4,054,251 A | * | 10/1977 | Henderson et al. | 242/563.1 |
| 4,766,716 A | * | 8/1988 | Dominguez | 53/551 |
| 4,781,317 A | * | 11/1988 | Ditto | 226/27 |
| 4,958,111 A | * | 9/1990 | Gago | 318/6 |
| 5,087,313 A | * | 2/1992 | Duecker | 156/271 |
| 5,237,798 A | * | 8/1993 | Fukuda | 53/551 |
| 5,386,293 A | * | 1/1995 | Barnard et al. | 356/397 |
| 5,460,312 A | * | 10/1995 | Brau et al. | 226/15 |
| 5,813,587 A | * | 9/1998 | Nordgren | 226/29 |
| 5,845,465 A | * | 12/1998 | Bennett | 53/551 |
| 6,044,615 A | * | 4/2000 | Fukuda | 53/64 |
| 6,301,380 B1 | * | 10/2001 | Mullins et al. | 382/141 |
| 6,397,557 B1 | * | 6/2002 | Bassissi et al. | 53/51 |

FOREIGN PATENT DOCUMENTS

| | | | | |
|---|---|---|---|---|
| DE | 197 47 472 | * | 4/1999 | A21C/9/08 |
| EP | 0 586 201 | * | 9/1994 | B65B/43/12 |
| JP | 10-287308 | * | 10/1998 | B65B/41/10 |

* cited by examiner

Primary Examiner—Rinaldi I. Rada
Assistant Examiner—Paul Durand
(74) Attorney, Agent, or Firm—Lorusso, Loud & Kelly

(57) ABSTRACT

The present invention provides a filling apparatus establishing positional coincidence between creases preformed in a packaging material and actual creases to thereby improve the appearance of a packaging container. A light source irradiates a portion of the outer circumferential surface of a packaging material tube which includes an overlap. A sensor receives light emitted from the light source and reflected from the outer circumferential surface of the tube. The overlap is detected as a peak in the sensor output. Light reflected from an edge portion of the packaging material exhibits greater intensity and is seen as a peak in the sensor output indicating position of the overlap.

12 Claims, 14 Drawing Sheets

FILLING MACHINE

CROSS-REFERENCE TO RELATED APPLICATIONS

This application is a National Phase Application (35 USC 371) of PCT/JP00/04454 filed Jul. 5, 2000 and claims priority of Japanese Application No. 11-193194 filed Jul. 7, 1999 and Japanese Application No. 2000-164121 filed Jun. 1, 2000.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates to a filling apparatus.

2. Description of Related Art

Conventionally, in a filling apparatus for producing packaging containers filled with liquid food, such as milk or soft drink, a web-like packaging material is continuously formed into a tubular shape, while being transported, and then the tubular portion of the packaging material is filled with liquid food to thereby produce a packaged product.

FIG. 1 is a perspective view of a conventional filling apparatus.

In FIG. 1, reference numeral 11 denotes a packaging material. The packaging material 11 in the form of a roll 12 is loaded into the filling apparatus, is fed into the filling apparatus by means of an unillustrated feeder and is transported in a web-like form within the filling apparatus.

Subsequently, the web-like packaging material 11 is gradually formed into a tubular shape by means of an unillustrated forming ring and other components. The thus formed tubular portion of the packaging material 11 is longitudinally sealed by means of an unillustrated longitudinal sealing apparatus. While being transported downward, the packaging material tube is filled with liquid food supplied from above via a filling pipe 13. Next, while being nipped from both sides, the packaging material tube is laterally sealed at predetermined intervals by means of an unillustrated lateral sealing apparatus, thereby forming containers 14 each in the form of, for example, a pillow or a bag.

Subsequently, an unillustrated cutting apparatus cuts the packaging material tube at the laterally extending seal portions S1, thereby separating the containers 14 from one another. An unillustrated forming apparatus forms each of the containers 14 into a predetermined shape through bending along preformed creases, thereby completing a packaging container 15.

Since the packaging material tube has a substantially circular cross section, the transported packaging material tube presents difficulty in positioning. For example, forces received from the forming ring cause the packaging material tube to turn in the direction of arrow A1 or A2, whereby the longitudinally extending seal, i.e. overlap portion S2, deviates from a predetermined position. When the container 14 is shaped to form the finished packaging container 15 while the overlap portion S2 is improperly positioned, preformed creases of the packaging material 11 fail to positionally coincide with actual creases, resulting in a poor appearance of the packaging container 15.

FIG. 2 is a plan view of a container formed with an overlap portion located at a predetermined position. FIG. 3 is a plan view of a container formed with an overlap portion which has deviated from a predetermined position.

In FIGS. 2 and 3, reference numeral 14 denotes a container in an early stage of forming; reference numerals 14a and 14b denote lugs; reference numeral S1 denotes a lateral seal portion; reference numeral S2 denotes an overlap portion; and reference numerals m1 and m2 denote creases preformed in the packaging material 11 (FIG. 1) and along which the lugs 14a and 14b bend. As shown in FIG. 2, when the container 14 is formed with the overlap portion S2 properly located at the predetermined position, the creases m1 and m2 each assume the form of a straight line. Thus, the lugs 14a and 14b can be bent along the creases m1 and m2.

However, as shown in FIG. 3, when the container 14 is formed with the overlap portion S2 removed from the predetermined position, the creases m1 and m2 assume the form of segments out of alignment. As a result, the lugs 14a and 14b cannot be bent along the creases m1 and m2 and, instead, the lugs 14a and 14b bend along creases n1 and n2.

In order to cope with the above-described problem, a paper guide is disposed along an unillustrated transport path on which the web-like packaging material 11 travels. The paper guide is pressed against an edge portion of the packaging material 11 so as to move the packaging material 11 perpendicular to the direction of transport, thereby adjusting the position of the overlap portion S2 to coincide with the predetermined position.

However, in the conventional filling apparatus, because the paper guide is pressed against an edge portion of the packaging material 11, the edge portion is consequently damaged.

The packaging material 11 is formed through longitudinally cutting an unillustrated wide web at a plurality of positions. When variations in the width of the packaging material 11 arise due to positional cutting error, even the positional adjustment of the overlap portion S2 fails to cause positions of creases m1 and m2 to coincide with the positions of the creases n1 and n2.

FIG. 4 illustrates creases preformed in the packaging material. FIG. 5 is a sectional view of a packaging material tube.

In FIGS. 4 and 5, reference numeral 11 denotes a packaging material; reference numerals 11a and 11b denote edges of the packaging material 11; reference numerals m1 and m2 denote lateral creases preformed in the packaging material 11; and reference numerals m11 to m14 denote longitudinal creases preformed in the packaging material 11. When there is no positional cutting error, the width of the packaging material 11 is constant. However, when an error in cutting position occurs, variations in the width of the packaging material 11 result.

As a result, the distance α between the edge portion 11a and the crease m11 varies. Even when the position of the overlap portion S2 is adjusted in the course of formation of a packaging material tube 41 as shown in FIG. 5, the creases m1 and m2 fail to coincide with the creases n1 and n2 (FIG. 3), resulting in a poor appearance of the packaging container 15 (FIG. 1).

BRIEF SUMMARY OF THE INVENTION

Therefore, an object of the present invention is to solve the above-described problems in the conventional filling apparatus and to provide a filling apparatus capable of establishing positional coincidence between creases preformed in a packaging material and actual creases to thereby improve the appearance of the packaging container.

To achieve the above object, the present invention provides a filling apparatus including a light source for irradiating, with light, a portion of the outer circumferential surface of a packaging material including a longitudinal overlap; light detection means for issuing a sensor output upon reception of light emitted from the light source and reflected from the outer circumferential surface of the packaging material tube; and overlap location detection means for detecting the position of the overlap as a peak in the sensor output.

Light reflected from an end portion of the packaging material exhibits greater intensity and appears as a peak in sensor output from the light detection means. Accordingly, a location on the packaging material tube which causes emergence of a peak in the sensor output is detected as an overlap portion.

Since light reflected from the eNd portion of the packaging material is greater in intensity than light reflected from other portions of the packaging material, the face of a packaging container does not cause noise. Thus, the overlap portion can be detected with high accuracy.

Upon completion of a packaging container, a user can judge from the position of the overlap whether or not forming has been performed properly. Thus, sampling a packaging container from a production line becomes unnecessary, thereby simplifying the work of judging whether or not forming has been performed properly, and thus reducing the cost of production of a packaging container. Also, all packaging containers can be checked so as to see whether or not they have been formed properly.

Mere digitization of sensor output from the light detection means suffices, without need to first take an image and then process data regarding the taken image, thereby reducing the cost of manufacture of a filling apparatus. Since there is no need for direct contact with the packaging material, the overlap portion can be detected with high accuracy.

In another embodiment the filling apparatus of the present invention comprises packaging material tube formation means for forming a packaging material tube from a web-like packaging material; a guide roller rotatably disposed upstream of the packaging material tube formation means with respect to the transport direction of the packaging material and adapted to guide the packaging material; overlap portion detection processing means for detecting an overlap portion of the packaging material tube; and centering processing means for moving one end of the guide roller on the basis of the result of detection by the overlap portion detection processing means.

Since the position of an edge of the packaging material is changed, the overlap portion can be moved accordingly. That is, the position of the overlap portion can be adjusted such that the overlap portion is maintained in a predetermined position.

Also, creases preformed in the packaging material can be made to coincide with actual creases, thereby improving the appearance of a packaging container.

In still another embodiment, the filling apparatus of the present invention includes packaging material tube formation means for forming a packaging material tube from a web-like packaging material; a guide roller rotatably disposed upstream of the packaging material tube formation means with respect to the transport direction of the pack-aging material and adapted to guide the packaging material; a support mechanism for movably supporting one end of the guide roller; and a fulcrum mechanism for pivotably supporting the other end of the guide roller.

In this latter embodiment, when one end of the guide roller is moved, the packaging material is caused to move axially on the surface of the guide roller according to the amount of movement of the one end of the guide roller; i.e., the packaging material can be moved perpendicular to the direction of transport of the packaging material. Since the positions of the opposite edges of the packaging material are moved, the overlap can be moved accordingly, i.e., the position of the overlap portion can be adjusted.

Because adjustment of the position of the overlap does not involve the pressing of paper guides against edges of the packaging material, potential damage to the edges of the packaging material is avoided.

In the filling apparatus of the present invention one end of the guide roller is preferably moved along a direction parallel with the transport plane of the packaging material which approaches the guide roller. Since one end of the guide roller is moved along a direction parallel with a transport plane of the packaging material approaching the guide roller, there is no great change in the transport of the packaging material.

Further, it is preferred that one end of the guide roller be removably disposed in the support mechanism. Since one end of the guide roller is removably disposed, the work of loading the filling apparatus with the packaging material is simplified.

DETAILED DESCRIPTION OF THE INVENTION

A first preferred embodiment of the present invention will next be described in detail with reference to FIGS. 6–9 of the drawings.

Figure 1:
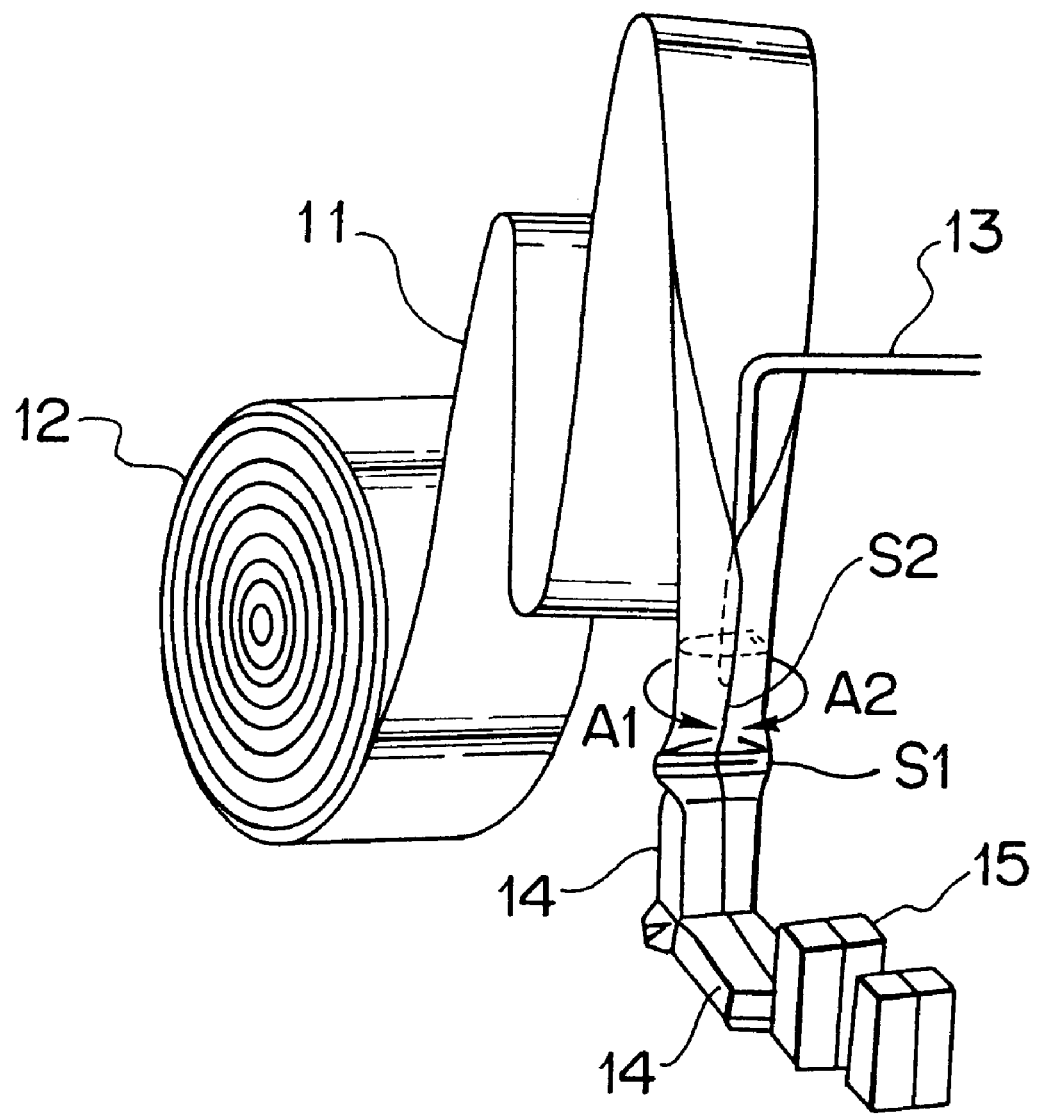
FIG. 1 is a view of a conventional filling apparatus.
Figure 2:
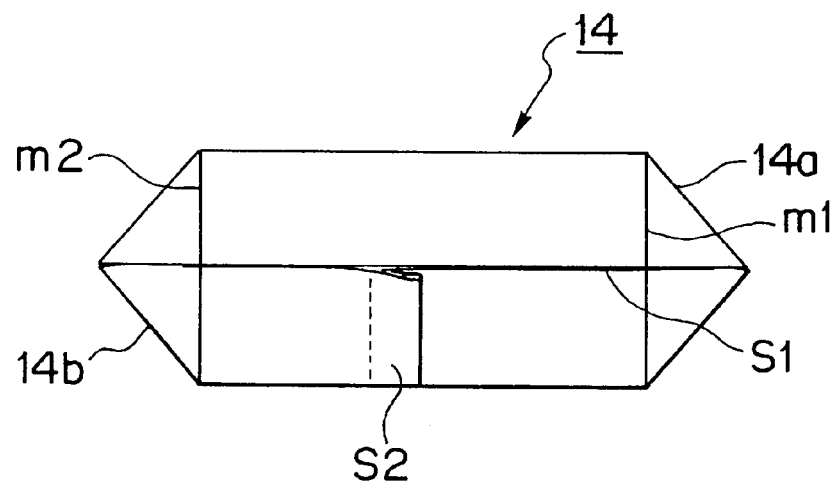
FIG. 2 is a plan view of a container in an early stage of formation with an overlap located at predetermined position.
Figure 6:
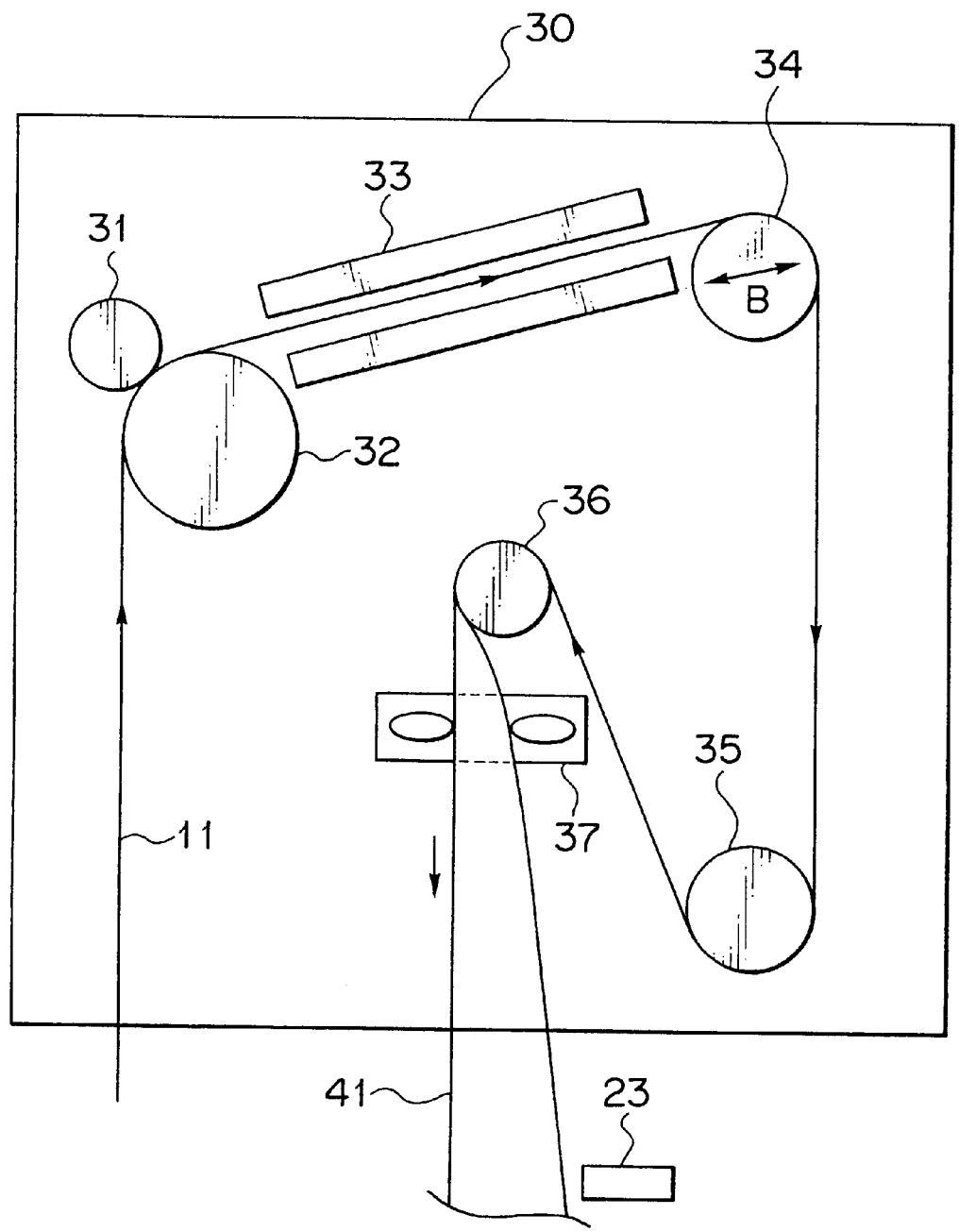
FIG. 6 is a conceptual view of a main portion of a filling apparatus according to a first embodiment of the present invention.

In FIG. 6 a packaging material 11 is fed into an aseptic enclosure containing a portion of the filling apparatus. The packaging material 11 fed from a roll 12 (see FIG. 1) is loaded onto the filling apparatus and fed by means of an unillustrated feeder for travel in a web-like form within the filling apparatus. In this case, as shown in FIG. 6, the packaging material 11 is transported upward as indicated by the arrow. The packaging material 11 fed into the aseptic enclosure 30 is held between feed rollers 31 and 32 and transported obliquely upward to an air knife unit 33. Subsequently, the packaging material 11 is transported obliquely upward within the air knife unit 33. In the course of transport within the air knife unit 33, hot air discharged from unillustrated nozzles removes germicide and the like adhering to the packaging material 11.

The packaging material 11 exiting from the air knife unit 33 is transported to a first guide roller 34. Guided by the first guide roller 34, the packaging material 11 is transported downward to a second guide roller 35. Guided by the second guide roller 35, the packaging material 11 is transported obliquely upward to a third guide roller 36 and is then transported downward guided by the third guide roller 36. While being passed through a forming ring 37 and other components, which collectively serve as the packaging material tube formation means, the packaging material 11 is gradually formed into the shape of a tube. An unillustrated longitudinal sealing apparatus longitudinally seals the tubular portion of the packaging material 11 into a packaging material tube 41. While being transported downward, the packaging material tube 41 is filled with liquid food supplied from above via a filling pipe 13. The first to third guide rollers 34–36 are located upstream of the forming ring 37 with respect to the transport direction of the packaging material 11 and serve to guide the packaging material 11.

Subsequently, the packaging material tube 41 exits the aseptic enclosure 30 and is transported to an unillustrated lateral sealing apparatus. In the lateral sealing apparatus, while being nipped from both sides, the packaging material tube 41 is laterally sealed at predetermined intervals, whereby lateral seal portions S1 are formed. Subsequently, an unillustrated cutting apparatus cuts the packaging material tube 41 at the lateral seal portions S1, thereby separating containers 14 each in the form of, for example, a pillow or a bag, from one another.

Figure 3:
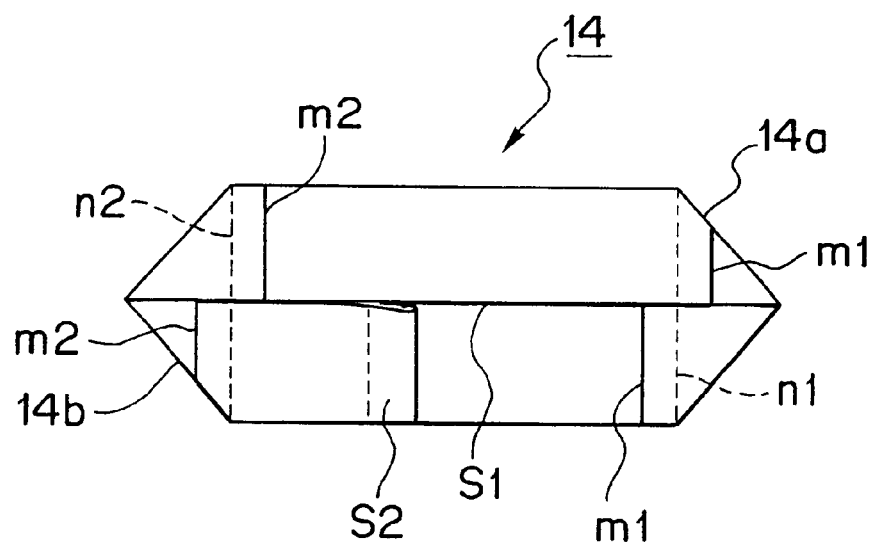
FIG. 3 is a plan view of a container as in FIG. 2, but with the overlap out of position relative to the predetermined position.

Since the packaging material tube 41 has a substantially circular cross section it presents difficulty in positioning. For example, force from the forming ring 37 tends to turn the packaging material tube 41 circularly, and thereby cause the overlap S2 to deviate from a predetermined position. When the packaging material is formed into the completed packaging container 15 with the overlap portion S2 not located in the predetermined position, creases m1 and m2 (see FIG. 3) preformed in the packaging material 11 do not coincide with actual creases n1 and n2, resulting in a poor appearance of the packaging container 15.

In order to cope with the above-described problem, a CCD 23 serving as the light detection means is disposed outside the aseptic enclosure 30 in the vicinity of the outlet for the packaging material tube 41. On the basis of sensor output from the CCD 23, the position of the overlap portion S2 is detected. On the basis of this detection of the position of overlap S2, one end of the first guide roller 34 is moved in the direction of arrow B so as to restore the overlap S2 to the predetermined position.

In this case, the direction of arrow B is the direction along which the packaging material 11 is transported between the feed rollers 31 and 32 and the first guide roller 34, i.e., in a direction parallel with the transport plane of the packaging material 11 approaching the first guide roller 34. Since one end of the first guide roller 34 is moved in the direction along which the packaging material 11 is transported to the first guide roller 34, there is no great change in the transport of the packaging material 11.

In this first embodiment one end of the first guide roller 34 is moved; however, one end of the second guide roller 35 may be moved, or one end of the first guide roller 34 and one end of the second guide roller 35 may be moved. When one end of the second guide roller 35 is to be moved, it is moved in the direction along which the packaging material 11 is transported between the first guide roller 34 and the second guide roller 35, i.e. in a direction parallel with the transport plane of the packaging material 11 approaching the second guide roller 35.

Figure 7:
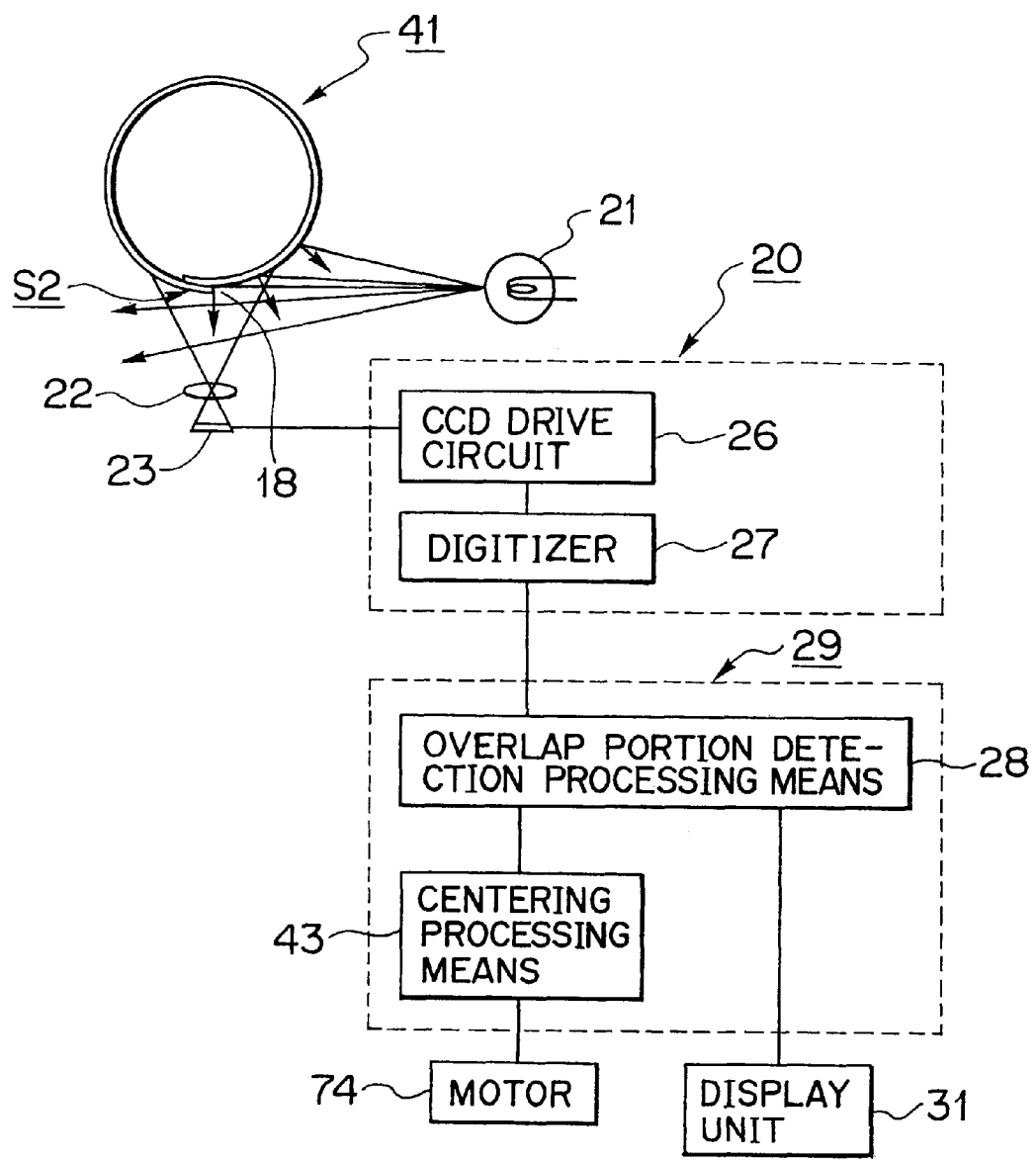
FIG. 7 is a block diagram of overlap adjustment control in the first embodiment of the present invention.
Figure 8:
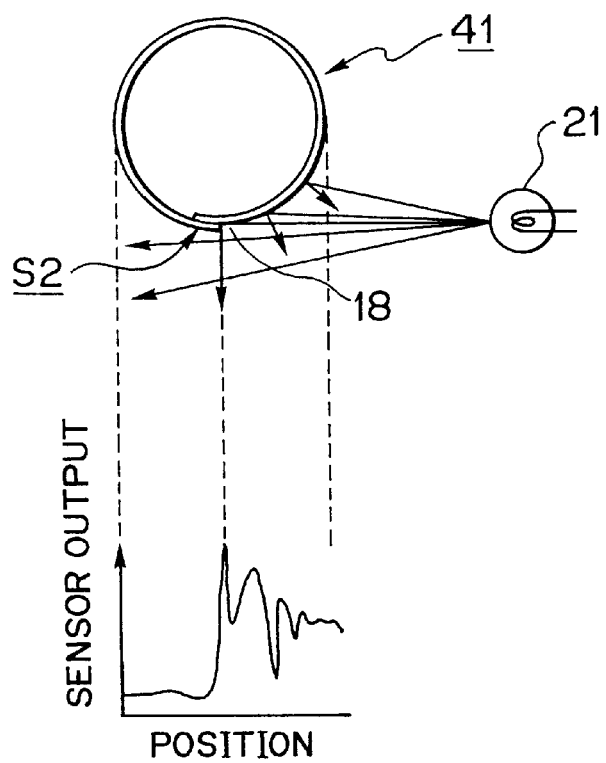
FIG. 8 is a view explaining a sensor output from a CCD in the first embodiment of the present invention.
Figure 9:
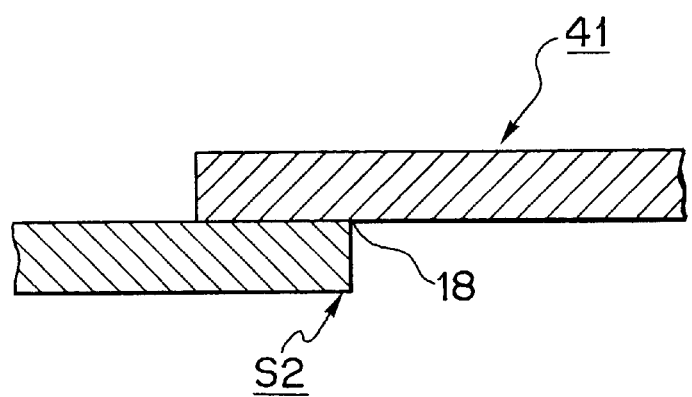
FIG. 9 is an enlarged sectional view of an overlap portion of a packaging material tube in the first embodiment of the present invention.

The overlap position adjustment mechanism for maintaining the overlap S2 at a predetermined position will now be described with reference to FIG. 7. As shown in FIG. 7, opposite edges of the packaging material tube 41 are superposed on each other at the overlap S2 to form a step on the outer circumferential surface of the packaging material tube 41. A light source 21 irradiates that portion of the outer circumferential surface of the packaging material tube 41 which includes the overlap S2. Thus, the light source 21 is disposed on a tangent to the packaging material tube 41 at the overlap S2, a predetermined distance away from the overlap S2, in such a manner as to face an end face 18 of the overlap S2. A lens 22, serving as a condensing member, is disposed on a line that passes through the center of the packaging material tube 41 and the end face 18, radially outward from the overlap S2. The lens 22 gathers light emitted from the light source 21 and reflected from the outer circumferential surface of the packaging material tube 41.

CCD 23 is disposed on a line that passes through the center of the packaging material tube 41 and the end face 18, at a predetermined position radially outward from the overlap S2 and the lens 22, as well as on the optical axis of the lens 22. The CCD 23 receives light gathered by the lens 22 and issues a sensor output (see FIG. 8). The CCD 23 may be a one-dimensional line sensor or a two-dimensional plane sensor. The lens 22 and the CCD 23 constitute first image pickup means.

When the light source 21 irradiates the packaging material tube 41, light reflected from the end face 18 exhibits greater intensity and causes a peak in the sensor output from the CCD 23. Accordingly, the overlap S2 is detected as a peak in the sensor output. In this case, since light reflected from the end face 18 is greater in intensity than light reflected from other portions of the packaging material tube 41, the face design of the packaging container 15 does not cause noise.

An image processor 20 includes a CCD drive circuit 26 and a digitizer 27. The CCD drive circuit 26 drives the CCD 23. A sensor output from the CCD 23 is sent to the digitizer 27 via the CCD drive circuit 26 and is digitized by the digitizer 27. In the present embodiment, a comparator can be used as the digitizer 27. The comparator compares the sensor output with a predetermined reference value and outputs 1 or 0. Output from the digitizer 27 is sent to a control unit 29.

The control unit 29 includes overlap detection processing means 28 and centering processing means 43. Upon reception of an output from the digitizer 27, the overlap portion detection processing means 28 detects a peak in the sensor output as indicative of position of the overlap S2. The overlap detection processing means 28 sends, as a detection signal, data indicative of the position of the overlap portion S2 to a display unit 31. The display unit 31 displays the position of the overlap S2 on the basis of the detection data.

The detection data is sent to the centering processing means 43 which drives a motor 74 (drive means) to move one end of the first guide roller 34.

Since the position of the overlap S2 is displayed on the display unit 31, when the packaging container 15 is completed, a user can judge from the position of the overlap S2 whether or not forming has been properly performed. Thus, sampling the packaging container 15 from a production line becomes unnecessary, thus reducing the cost of production of the packaging container 15. Also, all the packaging containers 15 can be checked so as to see whether or not they have been properly formed.

In order to detect the overlap S2, mere digitization of a sensor output from the CCD 23 suffices, without need to process image data, thereby reducing the cost of manufacture of the filling apparatus. Since detection of the overlap S2 does not require direct contact with the packaging material 11, the overlap S2 can be detected with high accuracy.

The detection data generated by the overlap portion detection processing means 28 is sent to the centering processing means 43 in real time. The centering processing means 43 calculates the deviation of the position of the overlap S2 detected by the overlap portion detection processing means 28 from the predetermined position therefor stored in the control unit 29 and performs feedback control on the basis of the deviation and drives the motor 74 accordingly. As a result, the position of one end of the first guide roller 34 is moved to thereby bring the overlap portion S2 to the predetermined position. In this manner, wasteful consumption of the packaging material 11 can be avoided.

Figure 10:
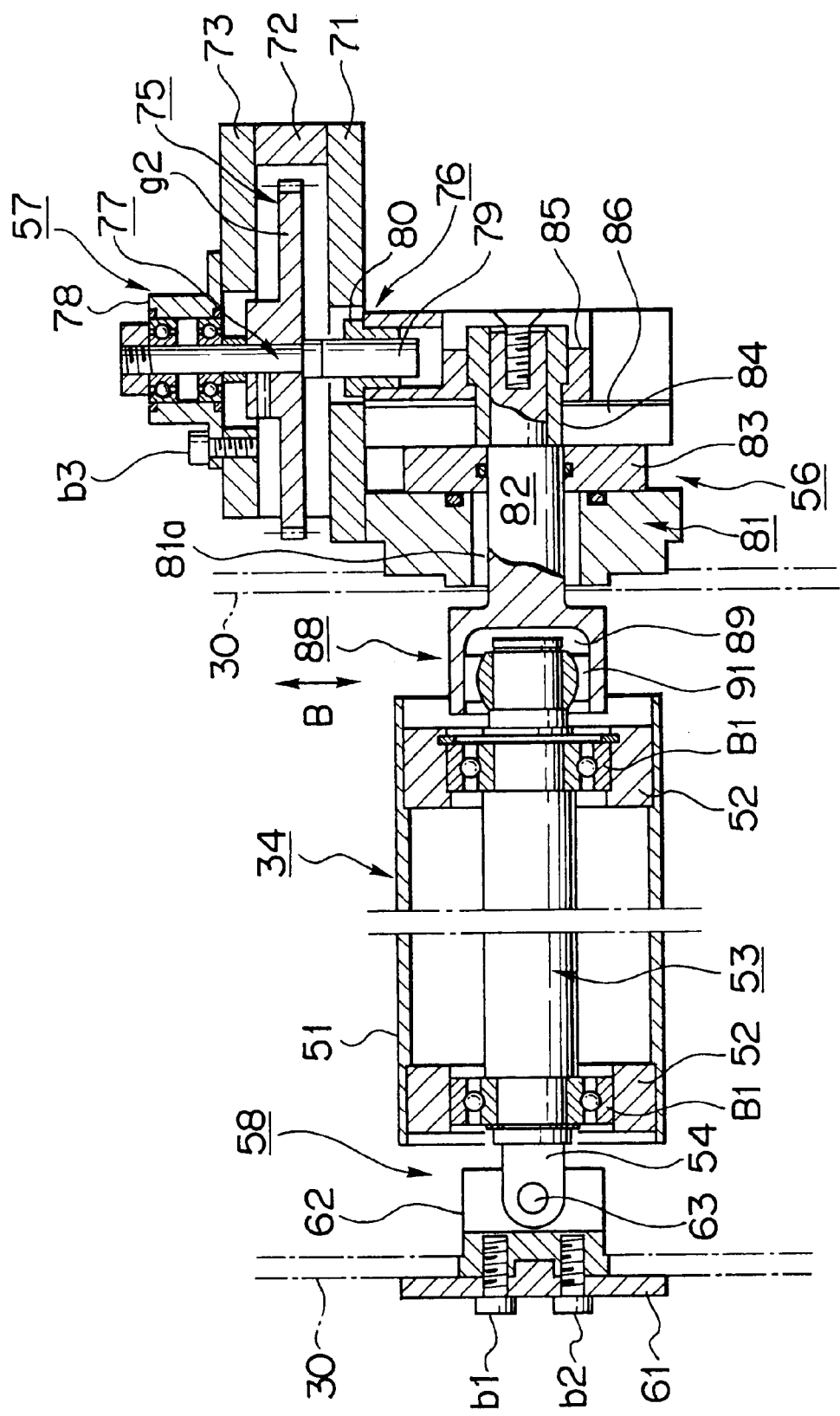
FIG. 10 is a front sectional view of a guide roller support mechanism in the first embodiment of the present invention.
Figure 11:
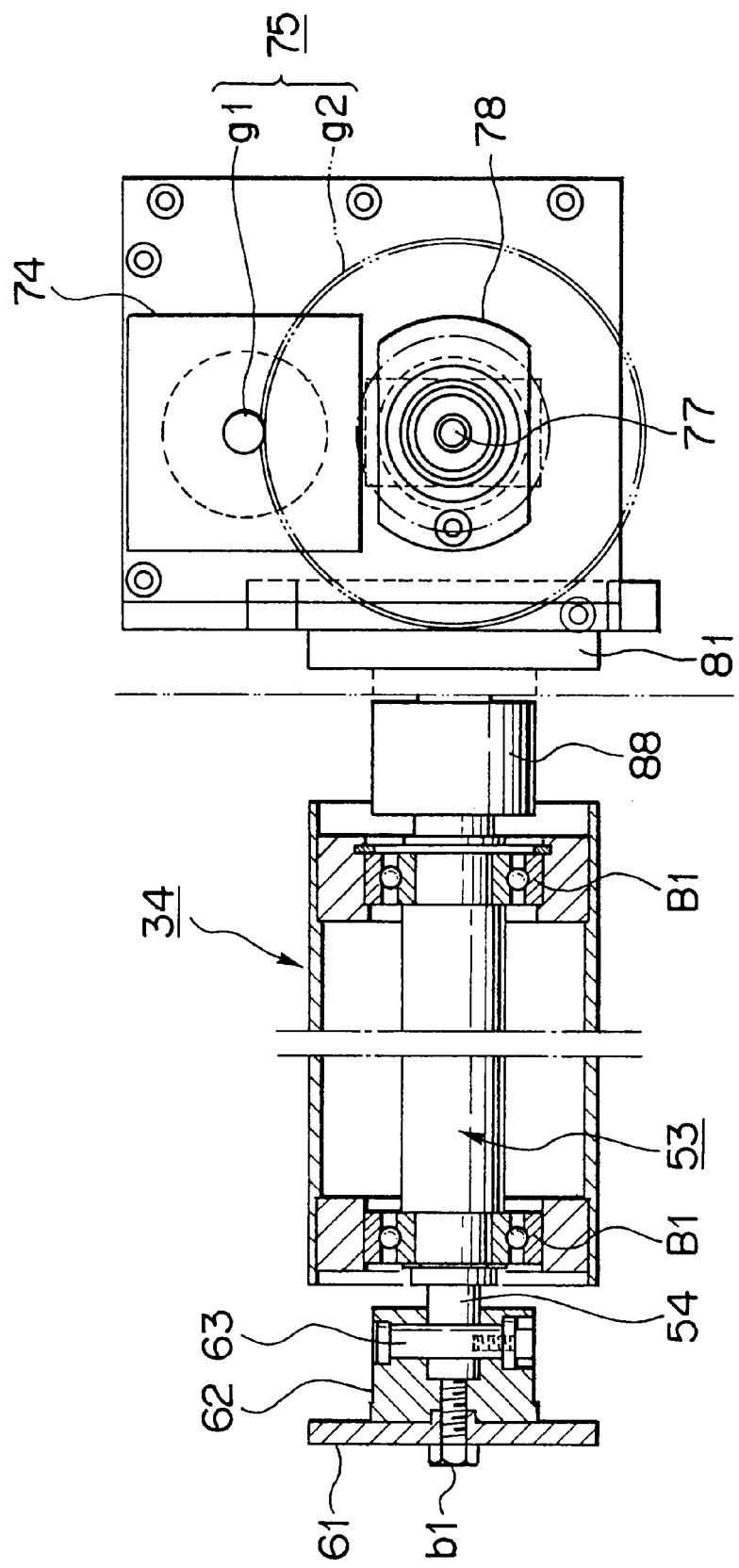
FIG. 11 is a plan view, partially in cross-section, of the guide roller support mechanism in the first embodiment of the present invention.
Figure 12:
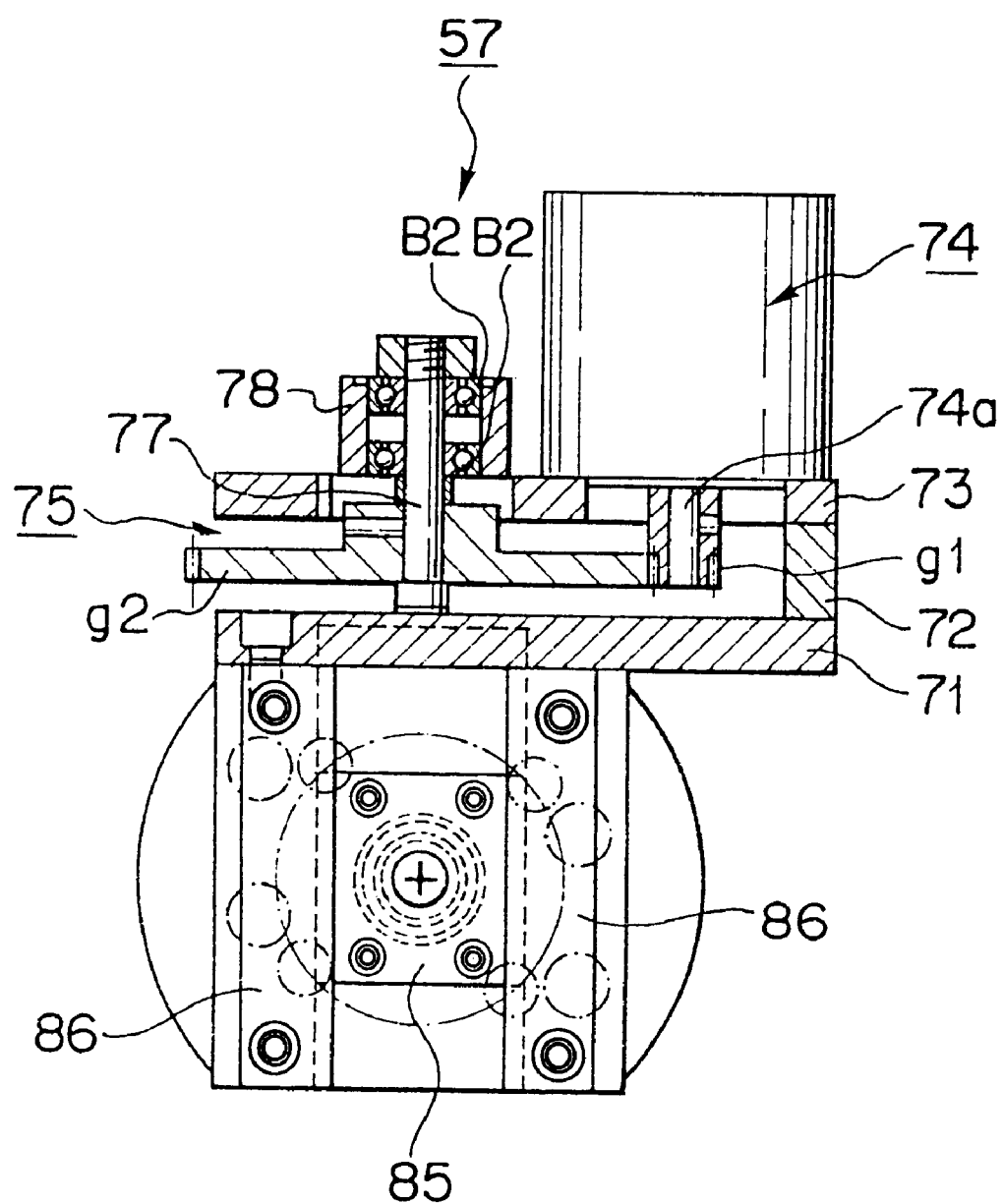
FIG. 12 is a side view, partially in cross-section, of the guide roller support mechanism in the first embodiment of the present invention.

Next, a guide roller support mechanism for moving one end of the first guide roller 34 will be described with reference to FIGS. 10–12. For convenience of explanation, the direction of arrow B in FIG. 10 is the vertical direction of the guide roller support mechanism.

As illustrated, the first guide roller 34 includes a cylindrical member 51 and a pair of bosses 52 disposed on the inner surface of the cylindrical member 51 in the vicinity of the opposing ends of the cylindrical member 51. A shaft 53 rotatably supports the first guide roller 34. Bearings B1 are disposed at opposite ends of the shaft 53 and the bosses 52 are fitted onto the corresponding bearings B1.

The guide roller support mechanism includes a support mechanism 56 for movably supporting one end of the first guide roller 34, a drive mechanism 57 for moving one end of the first guide roller 34, and a fulcrum mechanism 58 for pivotably supporting the other end of the first guide roller 34. In the guide roller support mechanism, one end of the first guide roller 34 can be moved in the direction of arrow B. Notably, the forming ring 37 (FIG. 6), the first guide roller 34, the support mechanism 56, the drive mechanism 57, the fulcrum mechanism 58 and other components constitute a mechanism for centering the packaging material tube 41.

The support mechanism 56 includes a flange 81 fixed on the aseptic enclosure 30 and a center shaft 82 disposed vertically movable with respect to the flange 81. A seal plate 83 is mounted on the center shaft 82, is slidable on the flange 81, and is adapted to maintain airtightness within the aseptic enclosure 30. A cylindrical joint collar 84 is fitted onto one end of the center shaft 82 and a slider 85 is attached to one end of the center shaft 82 via the joint collar 84. Slide guides 86 are disposed at opposite edges of the slider 85 so as to guide the slider 85 in the vertical direction.

The other end of the center shaft 82 is formed into a large-diameter portion 88. A cavity 89 is formed in the large-diameter portion 88 and a ball bearing 91 is disposed within the cavity 89. One end of the shaft 53 is pivotably supported by the center shaft 82 by means of the ball bearing 91. A through-hole 81a is formed in the flange 81 for allowing the center shaft 82 to extend therethrough such that, as the slider 85 moves vertically, the center shaft 82 can move vertically. The inside diameter of the through-hole 81a is greater than the diameter of a central portion of the center shaft 82.

The drive mechanism 57 includes a first plate 71 mounted on the upper end of the flange 81, a second plate 73 mounted on the first plate 71 via a spacer 72, a motor 74 mounted on the second plate 73, a speed-reducer 75 for reducing the speed of rotation of the motor 74, and a ball screw 76 serving as motion direction conversion means for converting rotation, at a speed reduced by the speed reducer 75, to a linear motion. The speed reducer 75 includes a first gear g1 of small diameter attached to an output shaft 74a of the motor 74 and a second gear g2 of large diameter attached to a shaft 77, which is supported for rotation relative to the second plate 73. The shaft 77 is supported by a bearing B2 disposed within a bearing case 78, which is mounted on the second plate 73 by bolts b3.

The ball screw 76 includes a ball screw shaft 79 formed as a lower half portion of the shaft 77 and a ball nut 80, which is screw-engaged with the ball screw shaft 79 and fixed on the upper end of the slider 85.

The fulcrum mechanism 58 includes a bracket 61 mounted on the aseptic enclosure 30, a support block 62 attached to the bracket 61 by bolts b1 and b2, and a pin 63 which extends through the support block 62 and pivotally supports the first guide roller 34 through a protrusion 54 formed an end of the shaft 53.

Next, the operation of the guide roller support mechanism will be described.

The motor 74 operates to rotate the output shaft 74a, which rotation is transmitted to the shaft 77 after being reduced in speed by the speed reducer 75. As the shaft 77 is rotated, the ball nut 80 is moved vertically, causing the slider 85 to move vertically along the slide guides 86. Accordingly, the center shaft 82 is caused to move vertically, thereby moving one end of the first guide roller 34 in the direction of arrow B.

In this manner, the packaging material 11 is caused to move axially on the surface of the first guide roller 34 by an amount corresponding to the amount of movement of the center shaft 82. That is, the packaging material 11 can be shifted perpendicular to its transport direction. Since opposing edges of the packaging material 11 vary in position, the overlap S2 is repositioned accordingly.

In this adjustment of the position of the overlap S2, there is no need to press a paper guide against an edge of the packaging material 11, whereby potential damage to edges of the packaging material 11 is avoided.

Next, a second embodiment of the present invention will be described with reference to FIGS. 13–15. Structural features similar to those of the first embodiment are denoted by common reference numerals, and description thereof is not repeated here.

Figure 13:
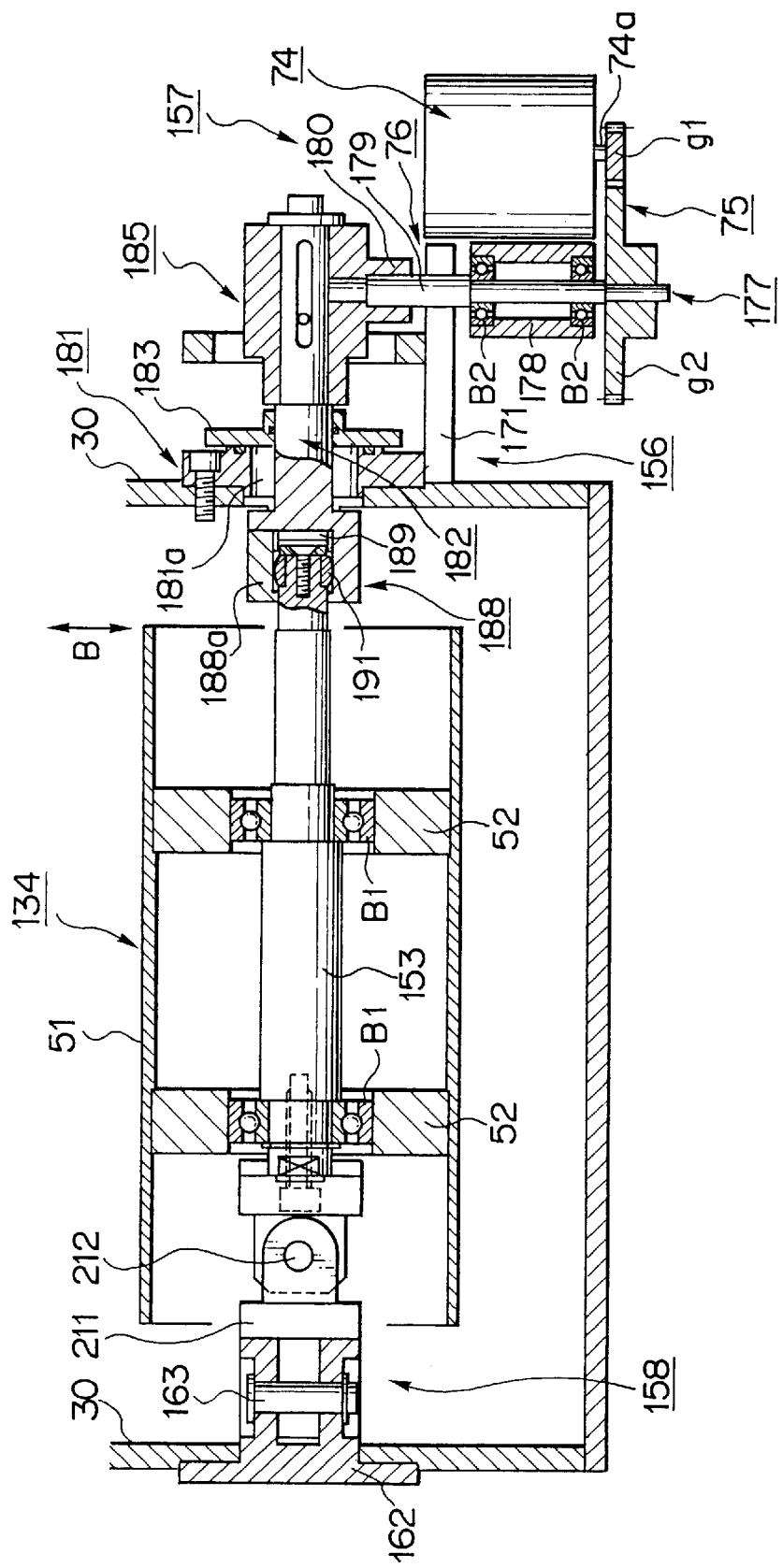
FIG. 13 is a front sectional view of a guide roller support mechanism in a second embodiment of the present invention.

As illustrated in FIG. 13, a shaft 153 rotatably supports a first guide roller 134. The guide roller support mechanism includes a support mechanism 156 supporting one end of the first guide roller 134, a drive mechanism 157 for moving that one end of the first guide roller 134, and a fulcrum mechanism 158 for pivotably supporting the other end of the first guide roller 134. The one end of the first guide roller 134 can be moved in the direction of arrow B.

The support mechanism 156 includes a flange 181 fixed to the aseptic enclosure 30, a center shaft 182 which is vertically movable relative to the flange 181, a seal plate 183 mounted on the center shaft 182 and slidable on the flange 181 to maintain airtightness within the aseptic enclosure 30. A slider 185 is attached to one end of the center shaft 182 and slide guides 186, disposed at opposite edges of the slider 185, guide the vertical movement of the slider 185.

The center shaft 182 has one end formed into a large-diameter portion 188 with a cavity 189. A ball bearing 191 is removably disposed within the cavity 189. One end of the shaft 153 is pivotably supported by the center shaft 182 by means of the ball bearing 191. A through-hole 181a is formed in the flange 181 and the center shaft 182 extends therethrough so that, as the slider 185 moves vertically, the center shaft 182 can also move vertically. The inside diameter of the through-hole 181a is greater than the diameter of a central portion of the center shaft 182.

The drive mechanism 157 includes a plate 171 mounted on the lower end of the flange 181, a motor 74 mounted on the plate 171 and serving as drive means, a speed reducer 75 for reducing the speed of rotation output by the motor 74, and a ball screw 76, serving as motion direction conversion means, for converting the rotation at reduced speed to linear motion. The speed reducer 75 includes a first gear g1 of small diameter attached to an output shaft 74a of the motor 74 and a second gear g2 of large diameter attached to a shaft 177, which is disposed rotatably with respect to the plate 171. The shaft 177 is supported by a bearing B2 disposed within a bearing case 178.

The ball screw 76 includes a ball screw shaft 179 formed as an upper half portion of the shaft 177 and a ball nut 180, which is screw-engaged with the ball screw shaft 179 and formed integrally with the slider 185.

The fulcrum mechanism 158 includes a support block 162 mounted on the aseptic enclosure 30, a pin 163 which extends through the support block 162 and pivotally supports a connection member 211, and a pin 212 which extends through the connection member 211 and serves as the center of pivotal motion of the first guide roller 134 through support of a protrusion 154 formed on an end of the shaft 153.

The motor 74 rotates the output shaft 74a, which rotation is transmitted to the shaft 177 after reduction in speed by the speed reducer 75. As the shaft 177 is rotated, the ball nut 180 is moved vertically, causing the slider 185 to move vertically along the slide guides 186. Accordingly, the center shaft 182 is caused to move vertically, thereby moving one end of the first guide roller 134 in the direction of arrow B.

Figure 14:
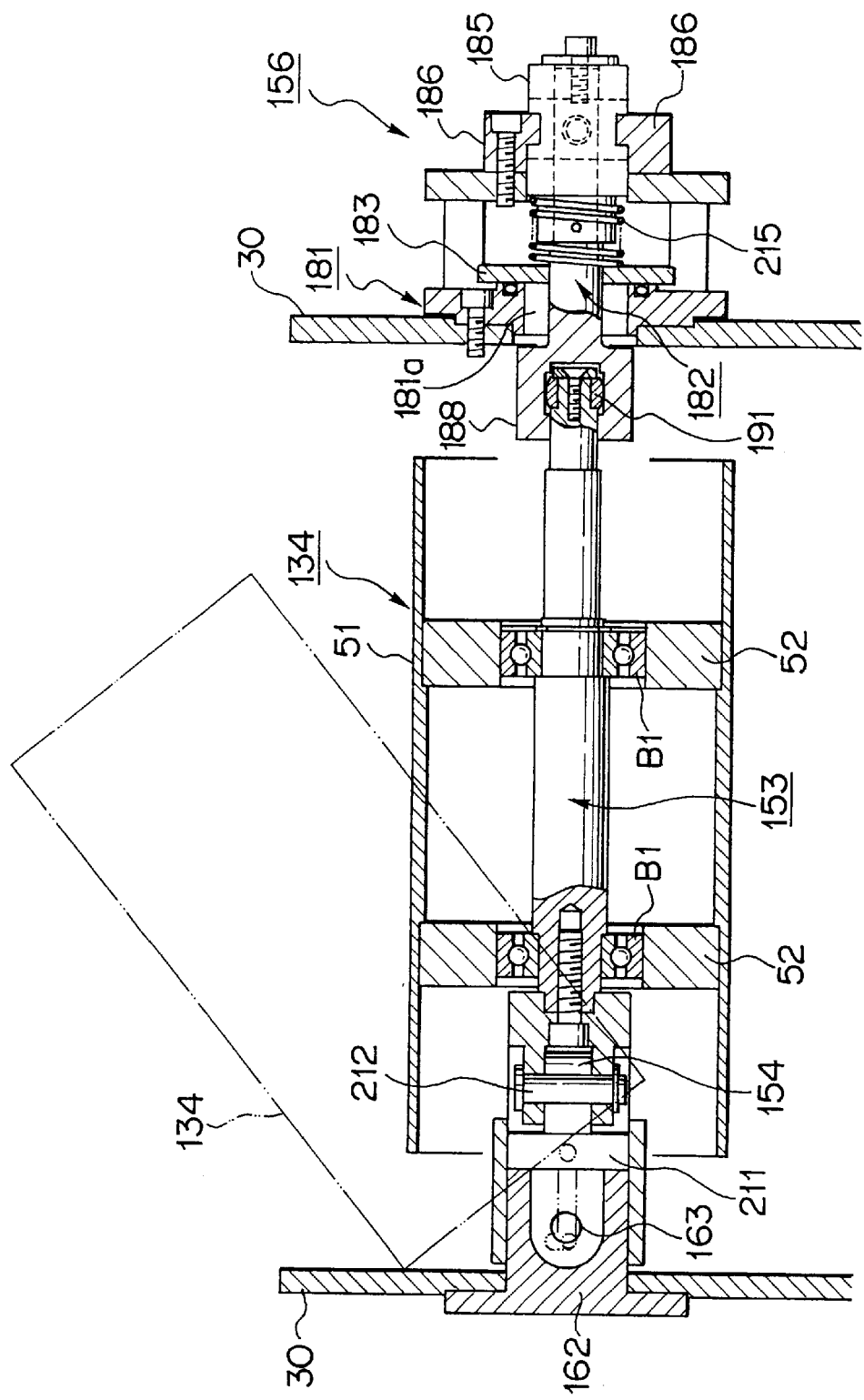
FIG. 14 is a plan view, in cross-section, of the guide roller support mechanism of the second embodiment of the present invention.
Figure 15:
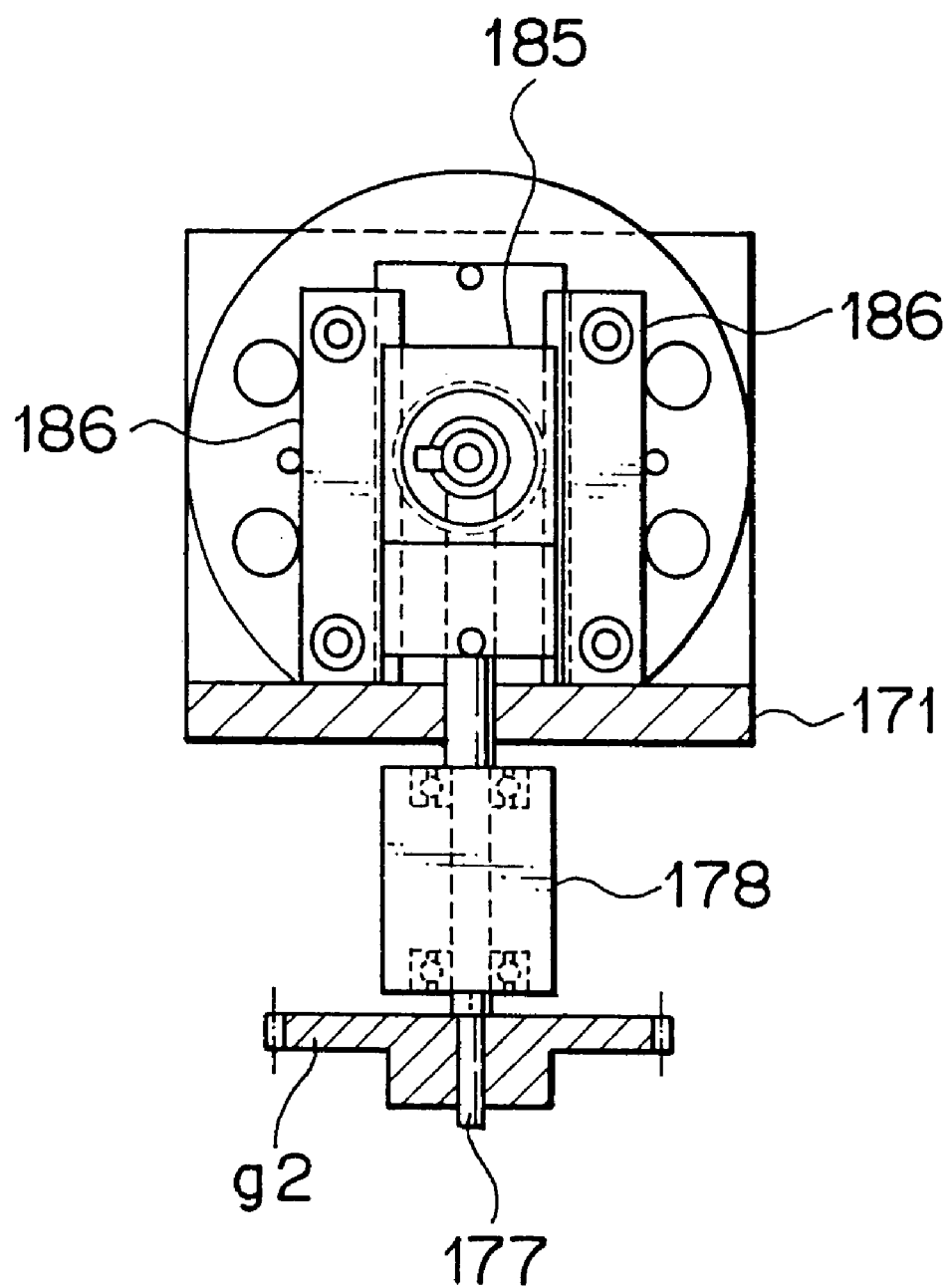
FIG. 15 is a side view, partially in cross-section, of the guide roller support mechanism of the second embodiment of the present invention.

In order to simplify the loading of the filling apparatus with the packaging material 11 (FIG. 6), the first guide roller 134 can be pivoted about the pin 163 as illustrated by the dot-and-dash line in FIG. 14. Specifically, an arcuate part 188a of the large-diameter portion 188 can be opened/closed by means of an unillustrated hinge. After the arcuate part 188a is opened, the ball bearing 191 can be detached from or attached to the large-diameter portion 188.

A spring 215 is disposed between the seal plate 183 and the slider 185 and biases the slider 185 away from the seal plate 183.

Figure 5:
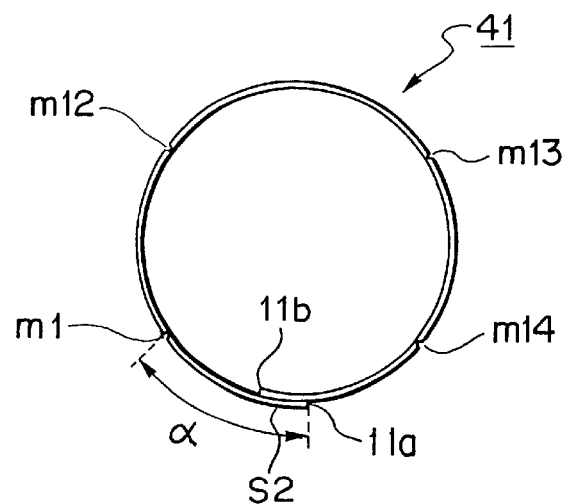
FIG. 5 is a sectional view of a packaging material tube.

The packaging material 11 is formed by longitudinally cutting an unillustrated originally wider web at a plurality of positions. When variations in the distance α (see FIG. 5) arise due to errors in the position of cutting, even adjustment of the position of the overlap S2 will fail to establish the positional coincidence between the creases m1 and m2 (see FIG. 3) preformed in the packaging material 11 and the actual creases n1 and n2.

A third embodiment of the present invention will now be described with reference to FIGS. 16 and 17. This embodiment is configured to cope with the above-described problem by detecting preformed crease m11 and, on the basis of the detected position of the crease m11, makes a correction. Structural features similar to those of the first embodiment are denoted by common reference numerals, and description thereof is not repeated here.

Figure 4:
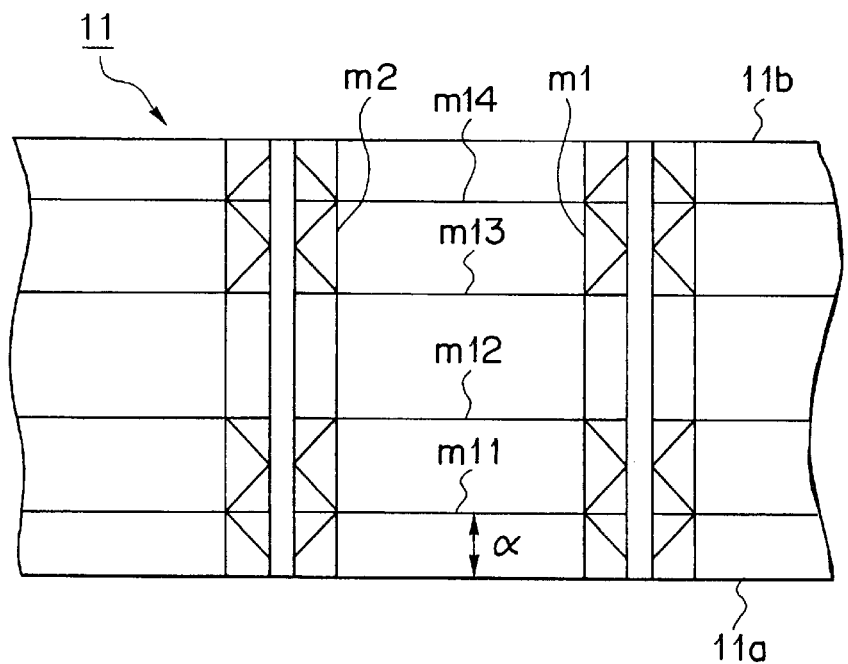
FIG. 4 is a plan view of a creased packaging material.
Figure 16:
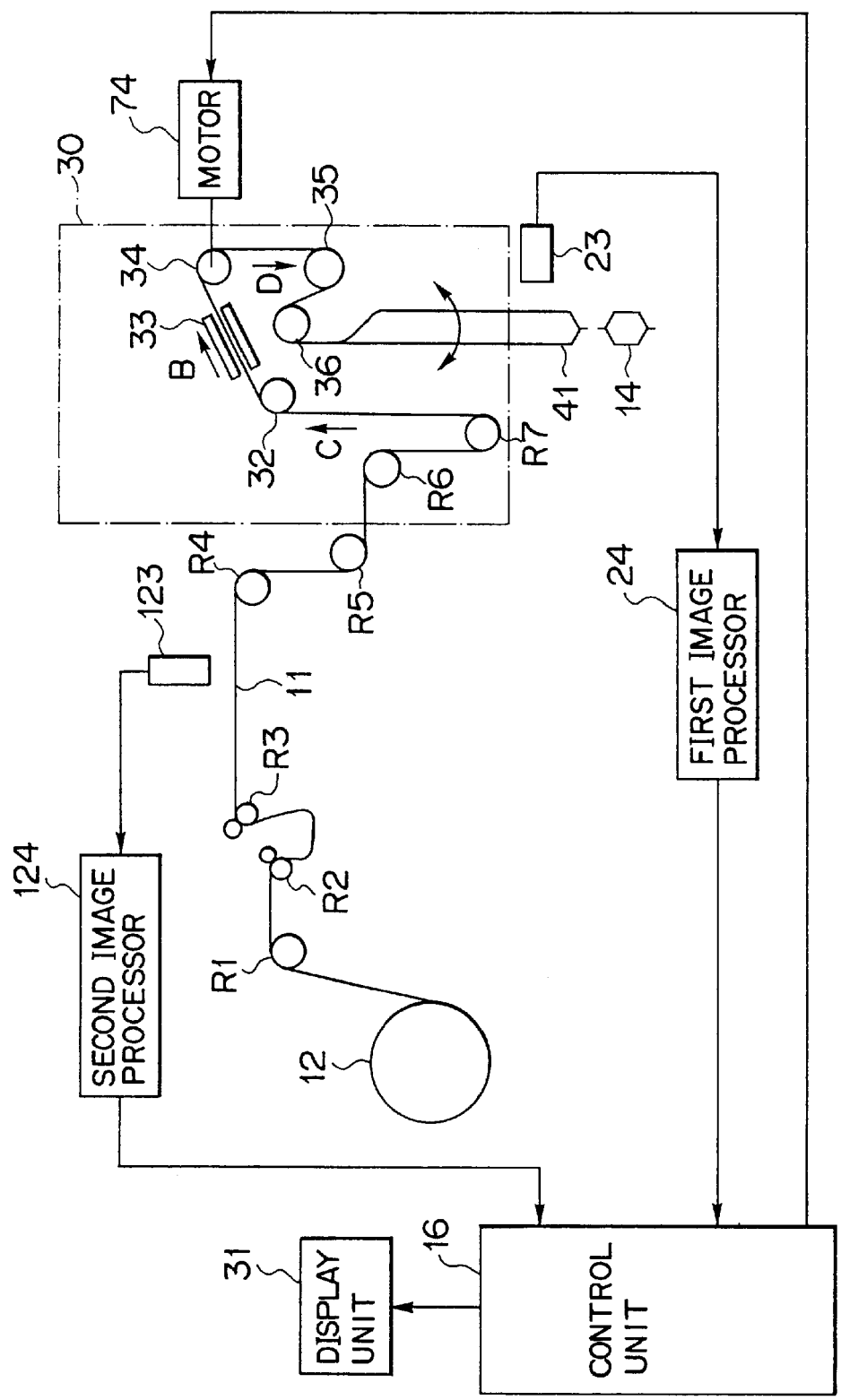
FIG. 16 is a schematic diagram of a filling apparatus according to a third embodiment of the present invention.
Figure 17:
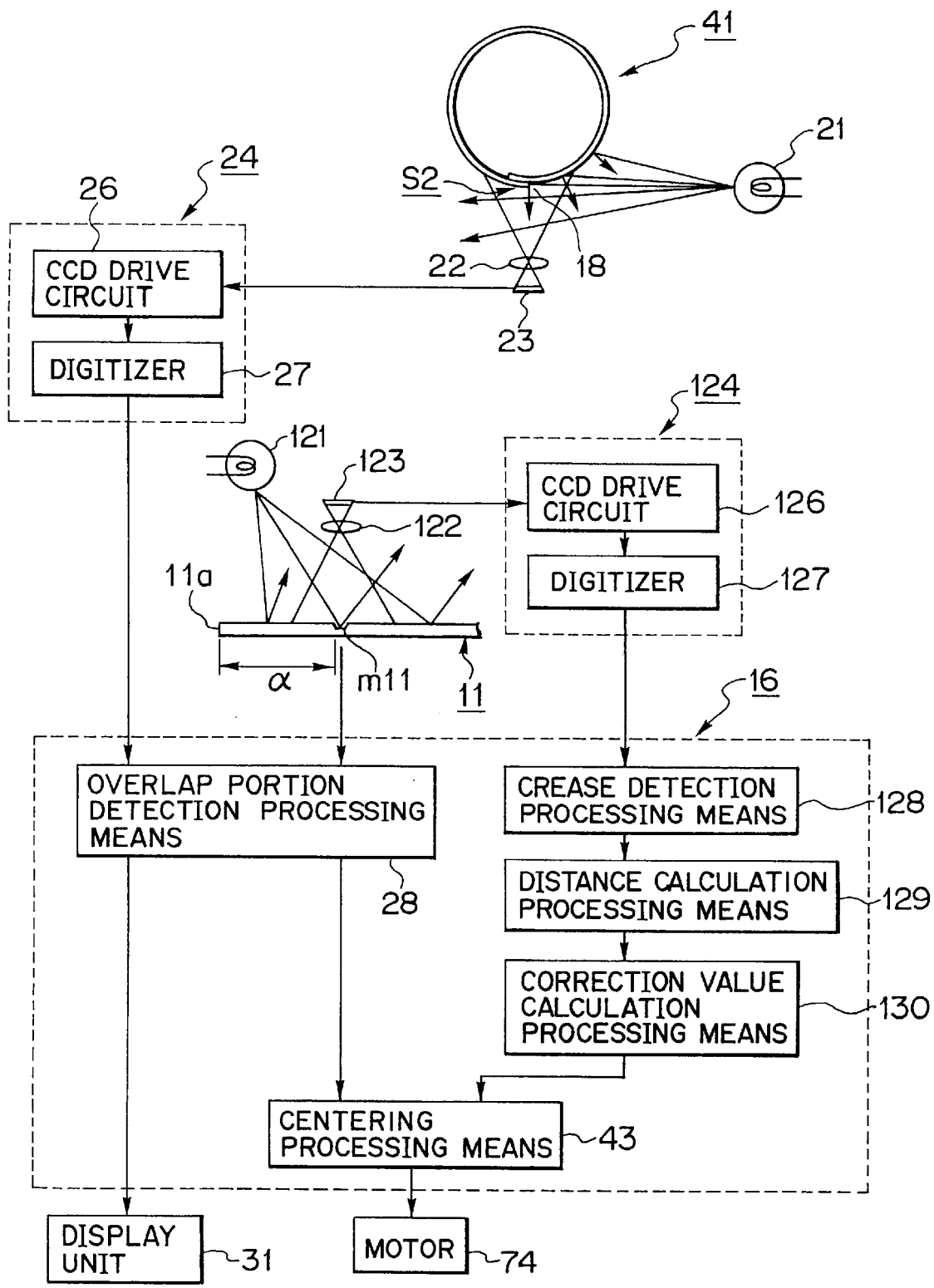
FIG. 17 is a block diagram of overlap adjustment control apparatus in the third embodiment of the present invention.

In FIGS. 16 and 17, reference numeral 11 denotes a packaging material. The packaging material 11 is formed by longitudinally cutting an unillustrated original wider web at a plurality of positions. The creases m1, m2, and m11–m14 (see FIG. 4) are preformed in the packaging material 11.

The packaging material 11 is fed into the aseptic enclosure 30 by means of an unillustrated feeder while being guided by rollers R1–R5. After being fed into the aseptic enclosure 30, the packaging material 11 is guided by the rollers R6 and R7, and is then transported upward as indicated by arrow C. Subsequently, the packaging material 11 is transported by a feed roller 32 and is fed obliquely upward to an air knife unit 33. Subsequently, the packaging material 11 is transported obliquely upward as indicated by arrow B within the air knife unit 33. In the course of transport within the air knife unit 33, hot air discharged from unillustrated nozzles removes germicide and the like adhering to the packaging material 11.

The packaging material 11 exiting the air knife unit 33 is fed to a first guide roller 34 which guides the packaging material 11 downward, as indicated by arrow D, to a second guide roller 35. Guided by the second guide roller 35, the packaging material 11 is transported obliquely upward to a third guide roller 36 and, guided by the third guide roller 36, the packaging material 11 is transported downward. In passage through forming ring 37 (FIG. 6) and other components, which collectively serve as the packaging material tube formation means, the packaging material 11 is gradually formed into the shape of a tube. An unillustrated longitudinal sealing apparatus longitudinally seals the tubular portion of the packaging material 11 into a packaging material tube 41.

Subsequently, the packaging exits the aseptic enclosure 30 and is transported to an unillustrated lateral sealing apparatus. In the lateral sealing apparatus, while being nipped from both sides, the packaging material tube 41 is laterally sealed at predetermined intervals, whereby lateral seal portions S1 (see FIG. 1) are formed. Subsequently, an unillustrated cutting apparatus cuts the packaging material tube 41 at the lateral seal portions S1, thereby separating containers 14 each assuming the form of, for example, a pillow or a bag. An unillustrated forming apparatus forms each of the containers 14 into a predetermined shape through bending along the preformed creases m1, m2, and m11–m14, thereby completing a packaging container 15.

A CCD 23 serving as the light detection means is disposed outside the aseptic enclosure 30 in the vicinity of an outlet for the packaging material tube 41 and facing the packaging material tube 41. Position of the overlap S2 is detected as output from the CCD 23 and on the basis of first detection data, one end of the first guide roller 34 is moved in the direction of arrow B, i.e., in the direction of transport of the packaging material 11 through the air-knife unit 33, so as to move the overlap portion S2 to a predetermined position.

Thus, the direction (the direction of arrow B) along which one end of the first guide roller 34 is moved is a direction parallel with the plane of transport of the packaging material 11 approaching the first guide roller 34, i.e., the path extending between the feed roller 32 and the first guide roller 34. In this manner, the packaging material 11 is caused to move laterally on the surface of the first guide roller 34 by an amount corresponding to the amount by which the one end of the first guide roller 34 is moved. That is, the packaging material 11 can be moved perpendicular to its transport direction. Since edges 11a and 11b of the packaging material 11 to be shaped by means of the forming ring 37 vary in position, the overlap portion S2 is moved and, accordingly, must be adjusted to return it to the predetermined position. As a result, when the preformed container 14 is formed into the final packaging container 15, positional coincidence is established between the creases m1 and m2 preformed in the packaging material 11 and the actual creases n1 and n2, to thereby improve the appearance of the packaging container 15.

In this third embodiment also, positional adjustment of the overlap portion S2 does not involve pressing of paper guides against the edges 11a and 11b of the packaging material 11, whereby potential damage to the edges 11a and 11b of the packaging material 11 is avoided.

Since the direction in which one end of the first guide roller 34 is moved is a direction parallel with the transport plane of the packaging material 11 approaching the first guide roller 34, the adjustment of the overlap portion S2 to a predetermined position does not involve a great change in the transport state of the packaging material 11.

Next will be described the mechanism for correcting the position of the overlap portion 52 of the packaging material tube 41 by moving one end of the first guide roller 34.

A first image processor 24 includes a CCD drive circuit 26 and a digitizer 27. The CCD drive circuit 26 drives the CCD 23 and sensor output from the CCD 23 is sent to the digitizer 27 via the CCD drive circuit 26 and digitized at the digitizer 27. In the present embodiment, a comparator can be used as the digitizer 27. The comparator compares the sensor output with a predetermined reference value and outputs 1 or 0, which output from the digitizer 27 is sent to a control unit 16.

The control unit 16 includes overlap portion detection processing means 28, centering processing means 43, crease detection processing means 128, distance calculation processing means 129, and correction value calculation processing means 130. Upon reception of an output from the digitizer 27, the overlap portion detection processing means 28 detects a peak in the sensor output on the basis of the digitizer output to thereby detect position of the overlap portion S2. The overlap portion detection processing means 28 sends first detection data as a detection signal to a display unit 31 which displays the position of the overlap S2 on the basis of the first detection data.

The first detection data is sent to the centering processing means 43. On the basis of the first detection data, the centering processing means 43 drives the motor 74 to thereby move one end of the first guide roller 34.

When variations in the distance α arise due to error the original wider web, as noted above, even the adjustment of the position overlap portion S2 will fail to establish positional coincidence between the performed creases m1 and m2 and the actual creases n1 and n2. In order to cope with this problem, this third embodiment also detects preformed crease m11 and, on the basis of the detected position of the crease m11, the first detection data is corrected. In order to carry out the correction, a light source 121 is disposed a predetermined distance away from and facing the packaging material 11. The light source 121 irradiates a portion of the surface of the packaging material 11 which includes the crease m11. A lens 122 serving as a condensing member is disposed in opposition to the crease m11 and gathers light emitted from the light source 121 and reflected from the surface of the packaging material 11.

A CCD 123 is disposed between the rollers R3 and R4 in opposition to the packaging material 11 and located on the optical axis of the lens 122. The CCD 123 receives light gathered by the lens 122 and issues a sensor output. The CCD 123 may be a one-dimensional line sensor or a two-dimensional plane sensor. The lens 122 and the CCD 123 constitute second image pickup means.

A second image processor 124 includes a CCD drive circuit 126 and a digitizer 127. The CCD drive circuit 126 drives the CCD 123 and sensor output from the CCD 123 is sent to the digitizer 127 via the CCD drive circuit 126 and digitized at the digitizer 127. In this third embodiment, a comparator can be used as the digitizer 127. The comparator compares the sensor output with a predetermined reference value and outputs 1 or 0 which output is sent to the control unit 16.

Upon reception of an output from the digitizer 127, the crease detection processing means 128 detects the crease m11. The crease detection processing means 128 sends, as a detection signal, second detection data indicative of the position of the position of the crease m11 to the distance calculation processing means 129. On the basis of the second detection data, the distance calculation processing means 129 calculates the distance α between the edge portion 11a of the packaging material 11 and the crease m11 and sends the calculated distance α to the correction value calculation processing means 130. The correction value calculation processing means 130 calculates a correction value on the basis of the distance α and sends the calculated correction value to the centering processing means 43.

On the basis of the correction value, the centering processing means 43 corrects the first detection data and on the basis of the corrected first detection data, the centering processing means 43 drives the motor 74 to thereby move one end of the first guide roller 34. Accordingly, even when variations in the distance α arise due to errors in cutting, the position of the overlap portion 32 is adjusted on the basis of the corrected first detection data so that the overlap portion S2 is brought to the predetermined position, and to provide positional coincidence between the preformed creases m1 and m2 and the actual creases n1 and n2.

When the position of the overlap portion S2 is adjusted on the basis of the first detection data, which data is corrected in accordance with the correction value, the actual position of the overlap S2 is slightly moved circularly in the direction of arrow A1 or A2. However, a part of the overlap S2 at which the packaging material 11 is longitudinally sealed does not vary greatly in position and, thus, sealing performance is not impaired.

According to the present embodiment, the first detection data is corrected on the basis of the second detection data. However, two modes may be provided for selection: in one mode, the position of the overlap portion S2 is adjusted merely on the basis of the first detection data; and in the other mode, the first detection data is corrected on the basis of the second detection data, and on the basis of the corrected first detection data, the position of the overlap S2 is adjusted.

In other words, the position of the overlap portion S2 can be adjusted on the basis of the first detection data, i.e. on the basis of the detected edge of the overlap, or on the basis of the corrected first detection data, i.e. on the basis of the detected crease. An unillustrated mode selector switch may be provided to allow selection of a mode.

In such a filling apparatus, wherein accuracy in forming is important, creases m11–m14 on the packaging material 11, as well as overlapping, must be positionally constant. Accordingly, the position of the overlap S2 is adjusted the basis of the creases and the position of the overlap S2 is adjusted on the basis of the edge.

In the present embodiment, the overlap portion S2 is detected as a sensor output from the CCD 23, the crease m11 is detected as a sensor output from the CCD 123, and the CCDs 23 and 123 are spaced from each other along the travel path of the packaging material. Variations in distance α due to the distancing between the CCDs 23 and 123 is negligible. That is, the variation in the distance α is very large as compared with the distance between the CCDs 23 and 123 as measured along the transport direction of the packaging material 11 and as measured along the transport direction of the packaging material tube 41.

The present invention is not limited to the above-described embodiments. Numerous modifications and variations of the present invention consistent with the spirit of the present invention are possible, and they are included within the scope of the present invention.

What is claimed is:

1. A filling apparatus, comprising:
   (a) tube formation means for overlapping opposing longitudinal edges of a weblike packaging material to form a tube having an overlap portion;
   (b) a guide roller rotatably disposed upstream of said tube formation means with respect to a transport direction of the packaging material approaching said guide roller, said guide roller changing the transport direction of the packaging material passing thereover and guiding the packaging material;
   (c) filling means for filling the tube;
   (d) a light source for irradiating, with light, a surface portion of an outer circumferential surface of the tube, the surface portion including at least the overlap portion and non-overlap portions;
   (e) light detection means for issuing sensor outputs in accordance with reception of light reflected from the surface portion of the packaging material tube; and
   (f) overlap portion detection processing means for detecting the overlap portion as a difference between a sensor output for the overlap portion and sensor outputs for the non-overlap portions.

2. A filling apparatus according to claim 1, wherein said light source is disposed in opposition to an end face presented by an edge of the packaging material in the overlap portion.

3. A filling apparatus according to claim 1, wherein said light detection means is disposed radially outward from an end part of the overlap portion.

4. A filling apparatus according to claim 3 wherein said light source is disposed on a tangent to the tube at said overlap portion.

5. A filling apparatus according to claim 1, further comprising a display unit for displaying position of the overlap portion.

6. A filling apparatus according to claim 1 wherein said light source is disposed on a tangent to the tube at said overlap portion.

7. A filling apparatus, comprising:
   (a) tube formation means for overlapping opposing longitudinal edges of a weblike packaging material to form a tube having an overlap portion;
   (b) a guide roller rotatably disposed upstream of said tube formation means with respect to a transport direction of the packaging material approaching said guide roller, said guide roller changing the transport direction of the packaging material passing thereover and guiding the packaging material;
   (c) filling means for filling the tube;
   (d) overlap portion detection processing means for detecting position of the overlap portion of the packaging material tube; and
   (e) centering processing means for moving one end of said guide roller along a direction parallel with a transport plane of the packaging material between said guide roller and an adjacent upstream roller contacting the packaging material, to pivot said guide roller about its opposite end, in accordance with the position of the overlap portion detected by said overlap portion detection processing means.

8. A filling apparatus, comprising:
   (a) tube formation means for overlapping opposing longitudinal edges of a weblike packaging material to form a tube with an overlap portion;
   (b) a guide roller rotatably disposed upstream of said tube formation means with respect to a transport direction of the packaging material, said guide roller changing the direction of transport of the packaging material guiding the packaging material;
   (c) filling means for filling the tube;
   (d) crease detection processing means for detecting position of a crease in the packaging material;
   (e) overlap portion detection processing means for detecting position of the overlap portion; and
   (f) centering processing means for moving one end of said guide roller along a direction parallel with a transport plane of the packaging material between said guide roller and an adjacent upstream roller contacting the packaging material, to pivot said guide roller about its opposite end, in accordance with the position of the crease detected by said crease detection processing means and the position of the overlap portion detected by the detection processing means.

9. A filling apparatus according to claim 8, further comprising:

(a) distance calculation processing means for calculating a distance between the crease and an edge portion of the packaging material in accordance with the position of the crease detected by said crease detection processing means; and (b) correction value calculation processing means for calculating, on the basis of the calculated distance, a correction value for correction of the position of the overlap detected by said overlap portion detection processing means.

10. A filling apparatus, comprising:

(a) tube formation means for forming a packaging material tube by overlapping opposing longitudinal edges of a weblike packaging material;

(b) a guide roller rotatably disposed upstream of said tube formation means with respect to a transport direction of the packaging material for guiding the packaging material passing thereover en route to said tube formation means;

(c) filling means for filling the tube;

(d) a support mechanism for movably supporting one end of said guide roller for movement along a direction parallel with a first transport plane of the packaging material between said guide roller and an adjacent upstream roller contacting the packaging material and for changing the transport direction of the packaging material from said first transport plane to a second transport plane, at an angle to said first transport plane, downstream of said guide roller; and (e) a fulcrum mechanism for pivotably supporting the other end of said guide roller.

11. A filling apparatus according to claim 10, further comprising a drive mechanism for moving one end of said guide roller in said parallel direction.

12. A filling apparatus according to claim 10, wherein one end of said guide roller is removably disposed in the support mechanism.

* * * * *